United States Patent [19]
Kresta

[11] Patent Number: 4,745,958

[45] Date of Patent: May 24, 1988

[54] TIRE-RIM VEHICLE WHEEL ASSEMBLY

[75] Inventor: Erich Kresta, Perchtoldsdorf, Austria

[73] Assignee: Semperit Reifen Aktiengesellschaft, Vienna, Austria

[21] Appl. No.: 733,461

[22] Filed: May 13, 1985

[30] Foreign Application Priority Data

May 28, 1984 [AT] Austria ................................. 1758/84

[51] Int. Cl.$^4$ ........................ B60C 15/00; B60B 21/10
[52] U.S. Cl. .................................. 152/540; 152/379.4; 152/383; 152/394; 152/544; 152/552; 152/559; 152/560; 152/DIG. 20
[58] Field of Search ............... 152/544, 547, 539, 382, 152/383, 388, 393, 397, 398, 404, 406, 407, 409, 410, 411, 540, 552, 559, 560, 394, 379.4, DIG.20

[56] References Cited

U.S. PATENT DOCUMENTS

| | | | |
|---|---|---|---|
| 1,932,191 | 10/1933 | Shoemaker | 152/397 |
| 3,924,670 | 12/1975 | Tangorra | 152/397 X |
| 4,109,696 | 8/1978 | Nakasaki | 152/544 X |
| 4,169,496 | 10/1979 | Cataldo | 152/397 X |

FOREIGN PATENT DOCUMENTS 2327026 12/1973 Fed. Rep. of Germany .
1438688 6/1976 United Kingdom .

Primary Examiner—Donald E. Czaja
Assistant Examiner—Thomas Bokan
Attorney, Agent, or Firm—Werner W. Kleeman

[57] ABSTRACT

The free end regions of the carcass of the tire form bead regions by extending these free end regions around a bead core. Each bead region of the tire carcass is seated on a related seat or seat surface formed at the tire rim. A first end region of a bead ring anchors the associated bead region on the associated seat and a second end region of this bead ring is locked in a locking groove formed at the related edge region of the tire rim. The bead ring is preferably made of spring steel and may be provided with cuts or cutouts in its second end region to facilitate the mounting thereof at the tire rim. The first end region of the bead ring may be vulcanized into or otherwise connected with the tire carcass. The seat may be formed at the inner circumferential surface or at the outer circumferential surface of the tire rim.

13 Claims, 6 Drawing Sheets

TIRE-RIM VEHICLE WHEEL ASSEMBLY

BACKGROUND OF THE INVENTION

The present invention relates to a new and improved construction of a tire-rim vehicle wheel assembly.

In its more particular aspects the present invention relates to a new and improved construction of a tire-rim vehicle wheel assembly comprising a tire rim and a tire made of rubber or other synthetic or rubber-like material having rubber-like properties. The tire comprises a uni-ply or multi-ply carcass with two free end regions, each of which is anchored in a related bead region by extending each such free end region around a related bead core or cable. The bead regions are seated at seats or seat surfaces of the tire rim.

In a conventional vehicle wheel the tire is held at a tire rim which is centrally provided with a drop or well base. The tire comprises tire beads containing tension-resistant bead cores or cables. The seats or seat surfaces for the tire beads follow the drop or well base of the tire rim in an outward direction on both sides thereof and at the outer circumference of the tire rim. The tire is held at the tire rim due to the fact that the bead regions are pressed against the seats or seat surfaces of the tire rim under the action of the inflation pressure. The tire is secured against lateral slide-off from the seats or seat surfaces by means of radially outwardly extending tire rim flanges. Since the bead cores or cables are responsible for a firm seat of the tire at the tire rim, the bead cores or cables are constructed from bundles or bunches of wire turns or windings in order to provide the required stability. Such wire turns or windings contribute a significant fraction to the total weight of the tire. There are further required appropriate measures for mounting tires which are equipped with such bead cores or cables at the tire rim such as, for example, a tire rim possessing a suitable drop or well base. It is a further disadvantage of such a conventional tire-rim vehicle wheel assembly that the tire beads, in the case of a defective, non-inflated tire, may become disengaged from the seats or seat surfaces of the tire rim already after a short running period. As a result, the tire as well as the tire rim are irreparably damaged.

In a tire-rim vehicle wheel assembly as known, for example, from German Patent Publication No. 3,206,171, there are not required wire-made bead cores or cables. Instead of the usual wire-made bead cores or cables there are proposed two tire rim rings which are made of metal or other material of similarly high strength. The tire rim ring may be vulcanized to the tire but may also be mounted by means of an adhesive bond in a firmly adhering and air-tight manner. The tire rim ring may also be mounted at the tire rim in a releasable manner or in a fixedly adhering manner by means of an adhesive bond. Bolting is suggested for the releasable connection; however, in such case sealing rings or sealing bands are required for an air-tight mounting. In this construction there is thus indispensable the handling of bolts or screws and sealing rings during the mounting operation of the tire. Concerning the connection of the tire rim ring with the tire rim by means of an adhesive bond, it is plainly evident that also this method is complicated and time-consuming, and furthermore, has the disadvantage that the tire is hardly disengagable from the tire rim.

In a further tire-rim vehicle wheel assembly as known, for example, from German Patent Publication No. 2,327,026, the tire bead regions are anchored at the tire rim in such a manner that there is also not required a wire-made bead core or cable. For this purpose the bead region of the tire is introduced between a tire rim flange and an auxiliary ring which is fixedly connected to the tire rim. An additional pressing element must be inserted between the tire rim flange and the bead region in order to anchor the bead region at the associated seat or seat surface. There is thus not only required the formation of suitable holding means at the tire rim but there is additionally required a manipulation with a separate structural component, namely the pressing element, during the mounting and dismounting operation of the tire.

A tire-rim vehicle wheel assembly as described, for example, in German Patent Publication No. 3,000,428, comprises seat surfaces at the inner circumference of the tire rim and tire beads which are held at the seats or seat surfaces. Each one of the lateral edge regions of the tire rim contains a radially inwardly extending tire rim flange which is followed by a seat or seat surface for the related tire bead. In accordance therewith the tire beads engage the inner circumference of the tire rim body and are secured against lateral slide-off from the seat or seat surfaces by the tire rim flanges. Following the seat or seat surfaces there are formed indentations or grooves in the tire rim which are provided for mounting of the tire at the tire rim. In order to hold the tire beads at the associated seats or seat surfaces it is further required to insert appropriate locking rings into the indentations or grooves or to form circumferential protrusions at the interior end regions of the seats or seat surfaces. An emergency run of the tire is insured due to the fact that the defective tire bears upon or is supported at two rim sections which are spaced from each other. In spite of the aforementioned measures for securing the tire beads at the tire rim by means of the tire rim flanges and the locking rings, it cannot be entirely excluded in this known construction that the tire beads will become disengaged from the tire rim at high loads or stresses acting upon the tire.

SUMMARY OF THE INVENTION

Therefore, with the foregoing in mind, it is a primary object of the present invention to provide an improved construction of a tire-rim vehicle wheel assembly which is not afflicted with the drawbacks and limitations of the prior art . constructions heretofore discussed and which can dispense with the use of conventional bead cores or cables.

Another important object of the present invention aims at the provision of a new and improved construction of a tire-rim vehicle wheel assembly which contains a relatively simply structured tire rim and which permits easy mounting of the tire at the tire rim.

Still a further significant object of the present invention is directed to a new and improved construction of a tire-rim vehicle wheel assembly which ensures a secure support of the tire at the tire rim in the case of an emergency run as well as under high load or stress.

Another, still important object of the present invention is directed to a new and improved construction of a tire-rim vehicle wheel assembly in which the seats or seat surfaces for the bead regions of the tire can be provided at the outer circumference as well as at the inner circumference of the tire rim.

Now in order to implement these and still further objects of the invention, which will become more readily apparent as the description proceeds, the tire-rim vehicle wheel assembly of the present development is manifested by the features that, the tire is held at the tire rim in axial direction by means of two bead rings, each of which is anchored with a first free end region in the associated bead region of the tire and each of which is releasably locked with a second free end region at the tire rim. The rim-associated second free end region of each bead ring can be expanded in a resilient manner. A bead filler made of an elastomeric material is provided as the bead core.

Due to the inventive measures there is provided a tirerim vehicle wheel assembly the tire of which does not requir a bead core which is made of steel wire since the bead rings provide a secure hold or support of the tire at the tire rim. The simply constructed tire rim, therefore, also does not require a drop or well base for mounting the tire and also the formation of the conventional tire rim flanges is not required due to the presence of the bead rings. The inventive construction is particularly advantageous during the mounting of the tire since the resiliently expandable bead rings can be readily drawn over the tire rim and nearly automatically lock to the tire rim. The tire rim connection provided by the bead rings withstands the highest loads and stresses and insures, in any case, also in an emergency run, that the tire is seated at the tire rim. Since no drop or well base is required at the tire rim, the central region of the tire rim can be formed in a manner which is known as such, namely, as a bearing or support surface for the tire during an emergency run.

According to a further feature of the inventive tire-rim vehicle wheel assembly the tire rim comprises upturned edge regions which form locking grooves into which the bead rings are locked. A secure locking of the bead rings to the tire rim is thereby insured in a particularly simple manner and this locking connection is readily releasable for dismounting the tire.

When the seats or seat surfaces for the bead regions are located at the outer circumference of the tire rim, it is an advantage that the edge regions of the tire rim which, according to the invention, form the locking grooves, are bent-off radially outwardly and in this case the seats or seat surfaces are designed as surfaces which approximately conically diverge away from the horizontal axial direction towards a central plane of the tire. There are thus obtained in this embodiment a simple structure of the tire rim, ready mounting of the tire and a secure hold or support of the bead regions at the tire rim.

These advantages are similarly present in a tire-rim vehicle wheel assembly in which the seats or seat surfaces are provided at the inner circumference of the tire rim. In this construction, according to the invention, the edge regions of the tire rim which form the locking grooves, are bent-off radially inwardly and the seats or seat surfaces form surfaces converging approximately conically towards the central plane of the tire.

The resiliently expandable end region of the bead rings can be formed in a simple manner according to the invention by providing each bead ring in the end region associated with the locking groove of the tire rim, with axially extending cuts or cutouts which preferably are arranged in a regularly spaced relationship.

According to the invention, each bead region of the tire is upset or up-turned such that the bead region is seated in an indentation or recess which is formed by an angled region of the bead ring. In this manner there is provided, on the one hand, a secure anchoring of the bead ring in the bead region of the tire and, on the other hand, a bearing or support surface of the bead region for the seat or seat surface of the tire rim.

A further advantageous construction of the inventive tire-rim vehicle wheel assembly is obtained by interrupting each locking groove by locking elements which are connected with the tire rim and which engage the cuts or cutouts in the bead ring. This construction is particularly advantageous when the vehicle wheel constitutes a drive wheel and considerable forces are transmitted to the drive wheel, so that there is the danger of a migration of the bead rings in the locking grooves. Such migration is effectively prevented by the inventive measures.

A further construction which ensures a particularly1 secure locking of the bead ring to the tire rim, is obtained by additionally forming in accordance with the invention an angled region in the rim-associated end region of each bead ring, which angled region engages a locking groove formed in a dually-angled edge region of the tire rim.

It is further of particular advantage if spring steel is used as the material for the bead rings. Spring steel is particularly suited due to its elasticity and strength.

The inventive tire-rim vehicle wheel assembly is also distinguished by permitting in a simple manner the mounting of the bead rings in the bead regions of the tire. Therefore each bead region of the tire in the non-vulcanized condition thereof can be layed around the angled end region of the bead ring and subsequently the tire can be vulcanized conjointly with the bead ring. There is thus provided a permanent bond between the bead rings and the tire. However, according to the invention it is also possible to mount the bead rings at the ready-formed and vulcanized tires.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
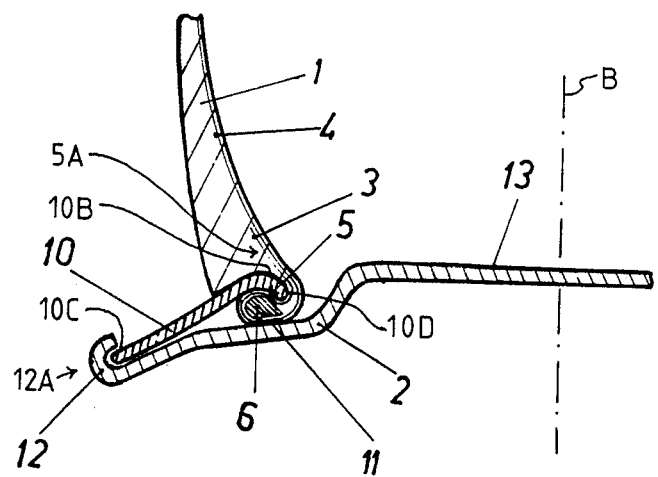
FIG. 1 illustrates part of a radial section through a first embodiment of the inventive tire-rim vehicle wheel assembly it being understood th at a similar mirror-image part of the radial section exists but which for convenience in illustration is not shown.

Describing now the drawings, it is to be understood that only enough of the construction of the tire-rim vehicle wheel assembly has been shown as needed for those skilled in the art to readily understand the underlying principles and of the present development, while simplifying the showing of the drawings. Turning attention now specifically to FIG. 1, there has been shown as part of a radial sectional view a first exemplary embodiment of the inventive tire-rim vehicle wheel assembly. As illustrated, the vehicle wheel assembly essentially comprises a tire 1, a rigid one-membered tire rim 2 and two bead rings 10 which are associated with the tire 1. The tire 1 is provided in known manner with a not particularly illustrated radial ply and with a uni-ply or multi-ply radial carcass 4. The free end regions 5A of the radial carcass 4 form two bead regions 5 and two bead cores, each of which is formed by a bead filler 6 which will be described hereinbelow. The free end regions 5A of the radial carcass 4 are thus anchored at the bead regions 5 of the tire 1. The carcass 4 is formed with an up-turn 3 which ends in the region of the side wall of the tire 1.

Each bead ring 10 holds the tire 1 in axial direction and thus defines a holding or support member, and each such holding member possesses a first end region 10B which is associated with and anchored at the associated bead region 5 of the tire 1. The first end region 10B of each bead ring 10 is bent-off towards the axial direction of the tire 1. Due to the angled configuration of each bead ring 10 there is formed an indentation or recess 10D in which the associated bead region 5 of the tire 1 is seated. The bead region 5 thus is formed by the portion of the carcass 4 which is radially outwardly bent-off and extended around the bead filler 6. In this structure the bead filler 6 constitutes a core element made of an elastomeric material, preferably rubber, which may have any desired cross-section. The angled or up-turned region of the carcass 4 can be additionally filled with cushioning elements or cushioning rubber elements.

A rim-associated second end region 10C of each bead ring 10 is associated with and releasably locked at the tire rim 2.

The tire rim 2 which is adapted to the base of the tire 1, comprises seats or seat surfaces 11 for the bead regions 5 of the tire 1. Each seat or seat surface 11 extends at an inclination angle in the range of about 2° to about 10° relative to the axial or horizontal directional of the tire 1 and constitutes a surface which conically diverges in the direction towards the central plane B of the tire 1 i e., diverges with respect to the horizontal axis of the tire 1 and the angle opens in a direction towards such central plane B. Due to this construction the mounting of the tire 1 at the tire rim 2 is facilitated. The outer end regions of the tire rim 2 are provided with radially outwardly up-turned edge regions 12A instead of tire rim flanges. There is thus formed a locking groove 12 for each bead ring 10 and which extends along the circumference of the tire rim 2.

Figure 1A:
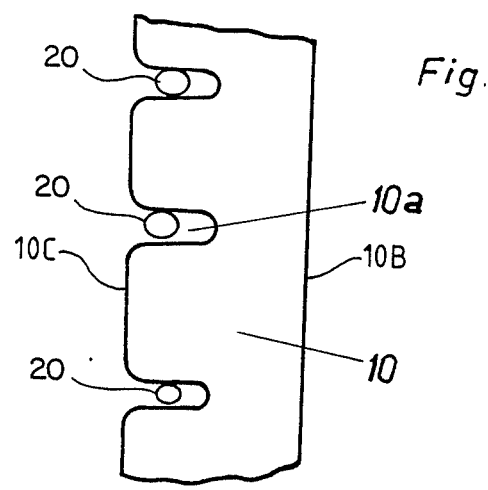
FIG. 1a is a top plan view of a part of a bead ring which is used for anchoring the tire at the tire rim in the tire-rim vehicle wheel assembly shown in FIG. 1.

The rim-associated second end region 10C of the bead ring 10 is associated with the locking groove 12, and it is evident from FIG. 1a that the second end region 10C is provided at regular intervals with cuts or cutouts 10a which are preferably provided at spacings in the range of 2 cm to 5 cm and which extend approximately up to a center line of the bead ring 10. Since the bead rings 10 are manufactured from a strong but resilient material like, for example, stainless spring steel, the cuts or cutouts 10a enable or facilitate the mounting of the tire 1. These cuts 10a are expanded when the bead ring 10 is drawn over the up-turned edge region 12A of the tire rim 2.

Due to the inventive anchoring of the tire 1 at the tire rim 2 by means of the two bead rings 10 there is ensured, even with a defective tire, i.e. during an emergency run, that the tire 1 cannot become disengaged from the tire rim 2. The bead rings 10 hold the bead regions 5 of the tire 1 in any case at the seats or seat surfaces 11 of the tire rim 2. Since the tire rim 2 does not require a drop or well base, an outer circumference 13 thereof can be designed as a bearing or support surface for the tire 1 during such emergency run.

The bead rings 10 can be positioned at the tire 1 in the non-vulcanized condition thereof and can be vulcanized conjointly with the tire 1. There is thus obtained a firm and permanent connection between the tire 1 and the bead rings 10. However, it is also possible to mount the bead rings 10 only at the ready-formed and vulcanized tire 1.

Figure 2:
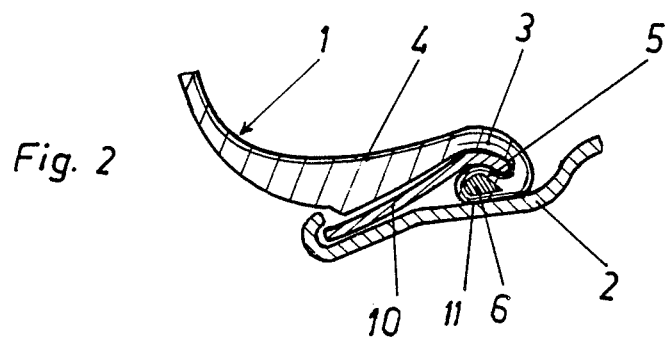
FIG. 2 illustrates part of a radial section through a second embodiment of the inventive tire-rim vehicle wheel assembly.

A second exemplary embodiment of the inventive tire-rim vehicle wheel assembly is illustrated in part in a radial sectional view in FIG. 2 and differs from the embodiment illustrated in FIG. 1 in a substantially more bulged configuration of the sidewall of the tire 1. Consequently, the lower end region of such sidewall extends approximately parallel to the bead ring 10 and essentially covers such bead ring 10.

Figure 3:
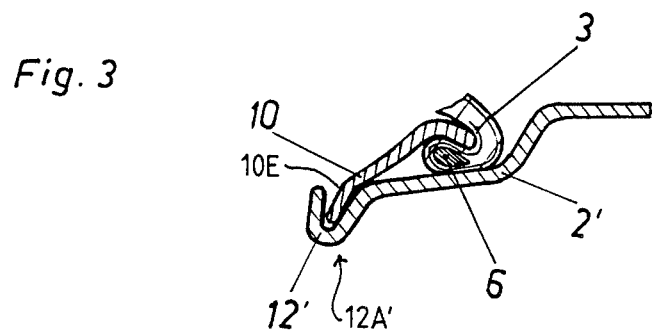
FIG. 3 illustrates part of a radial section through a third embodiment of the inventive tire-rim vehicle wheel assembly.

A third exemplary embodiment of the inventive tire-rim vehicle wheel assembly is illustrated in FIG. 3 in part of a radial section. Also this embodiment differs insignificantly from the aforementioned embodiments. The locking groove 12' of this vehicle wheel assembly is formed by a dually or double-angled edge region 12A' of the tire rim 2'. In the same manner and at least partially there is formed an additionally angled region 10E which is located between the cuts or cutouts 10a formed in the bead ring 10.

Figure 4:
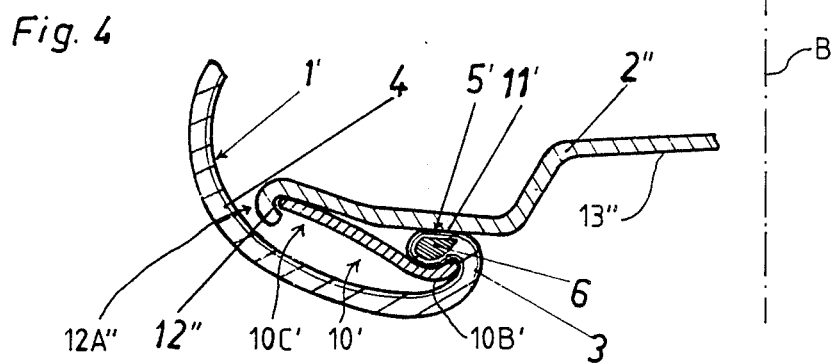
FIG. 4 illustrates part of a radial sectional view of a fourth embodiment of the inventive tire-rim vehicle . wheel assembly.

A fourth embodiment of the inventive tire-rim vehicle wheel assembly is illustrated in part of a radial sectional view in FIG. 4. In this further exemplary embodiment the seats or seat surfaces 11' at the tire rim 2": for the bead regions 5' are formed at the inner circumference 13" of the tire rim 2". In order to facilitate mounting the tire 1' at the tire rim 2", the seats or seat surfaces 11' are again formed, at a corresponding inclination which now is in a counter or opposite direction and thus converge towards the central plane B and the horizontal axis of the tire 1' as compared to the embodiments described hereinbefore. The bead ring 10' is adapted to such inclination but otherwise structured in the same manner as in the first embodiment illustrated in FIGS. 1 and 1a. The second end region 10C' of the bead ring 10' is held by a locking groove 12" which is formed by the up-turned edge region 12A" of the tire rim 2". In order to form the locking groove 12" the tire rim 2" is radially inwardly bent in this embodiment. The bead region 5' of the tire 1' is anchored in the first end region 10B' of the bead ring 10', and this bead region 5' is bent through an angle of about 180° with respect to the tire sidewall.

Figure 5:
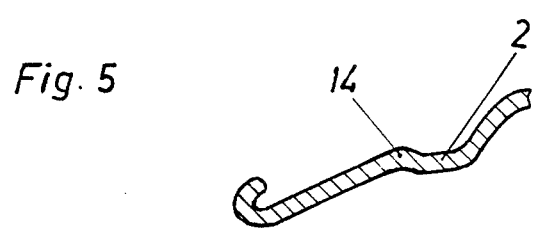
FIG. 5 illustrates part of a radial section through a fifth embodiment of the inventive tire-rim vehicle wheel assembly and shows only the tire rim of such assembly.

Only part of a radial sectional view of a fifth exemplary embodiment of the inventive tire-rim vehicle wheel assembly is illustrated in FIG. 5. In this embodiment the tire rim 2 can be provided in a manner which is known as such, with a so-called hump 14, and this hump 14 of the tire rim 2 either may be formed along the entire circumference of the tire rim 2 or may only be locally formed.

In all of the embodiments of the inventive tire-rim vehicle wheel assembly described hereinbefore the locking groove 12, 12', 12'' may be interrupted by locking elements 20 which are preferably formed from the material of the tire rim 2, 2' or 2'' and which, for example, may be welded to the tire rim 2, 2' or 2'' or fixedly connected thereto in any other known manner. The spacing between such locking elements 20 corresponds to the spacing between the cuts or cutouts 10a at the bead ring 10 or 10' In the mounted condition of the tire 1 or 1' the locking elements 20 engage the cuts 10a of the bead rings 10 or 10' This design is particularly advantageous if the inventive tire-rim vehicle wheel assembly is used as the drive wheel of a high-powered motorized vehicle, such as a heavy-duty truck. In such vehicles relatively strong forces are transmitted from the tire rim to the tire. Such construction effectively prevents the tire from migrating at the tire rim.

In all the embodiments described hereinbefore it is further possible to either vulcanize the tires 1 or 1' conjointly with the bead rings 10 or 10' or to mount the bead rings 10 or 10' at the finished and vulcanized tire 1 or 1'. Dismounting of the tire 1 or 1' from the tire rim 2, 2' or 2'' can be effected by a suitable tool which does not constitute subject matter of the present invention.

The invention is not restricted to the illustrated embodiments. Further modifications are possible within the spirit and teachings of the invention. In particular, details of the various embodiments can be combined with each other. Furthermore, the tire rim can also be structured as a two-membered tire rim. There can be used a tire made of rubber or synthetic material as well as a tire which is made of a fiber-reinforced material. The tire may constitute a radial-ply tire containing a belt as well as a diagonal-ply tire. As already mentioned hereinbefore, metal will be particularly used as the material of the bead ring. However, it is also possible to employ a synthetic or plastic material which possesses the required strength and elasticity.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. A tire-rim vehicle wheel assembly comprising:
a tire rim possessing two seat surfaces;
a tire;
said tire comprising a uni-ply or a multi-ply carcass having two free end regions;
said tire further comprising two bead regions and two bead cores, each of which bead cores is associated with a related one of said two bead regions;
said two bead regions being seated at related ones of said two seat surfaces of said tire rim;
each said free end region of the carcass of said tire being anchored in a related one of said two bead regions by extending around a related one of said two bead cores;
two bead rings defining holding members axially holding related one of said bead regions of the tire at said related seat surfaces of the tire rim;
each one of said two bead rings possessing a first end region associated with one of said two bead regions of said tire and anchored in said one of said two bead regions of said tire and a second end region associated with said tire rim and releasably locked at said tire rim;
said rim-associated second end region of each one of said two bead rings being expandable in a resilient manner; and
two bead fillers, each of which is made of an elastomeric material and each of which constitutes one of said two bead cores.

2. The vehicle wheel assembly as defined in claim 1, wherein:
said tire rim further comprises two up-turned edge regions;
each one of said two up-turned edge regions forming a locking groove; and
each one of said two bead rings being lockable in a related one of said two locking grooves by means of said second end regions of the associated one of said two bead rings.

3. The vehicle wheel assembly as defined in claim 2, wherein:
said tire rim defines an outer circumference;
said two seat surfaces of said tire rim which seat said two bead regions of said tire, being provided at said outer circumference of said tire rim;
said two up-turned end regions of said tire rim, which form said locking grooves, being up-turned radially outwardly;
said tire defining a central plane thereof; and
each one of said two seat surfaces being structured as an approximately conical surface diverging in a direction towards said central plane defined by said tire.

4. The vehicle wheel assembly as defined in claim 2, wherein:
said tire rim defines an inner circumference;
said two seat surfaces of said tire rim, which seat said two bead regions of said tire, being provided at said inner circumference of said tire rim;
said two up-turned end regions of said tire rim, which form said locking grooves, being up-turned radially inwardly;
said tire defining a central plane thereof; and
each one of said two seat surfaces being structured as an approximately conical surface converging in a direction towards said central plane defined by said tire.

5. The vehicle wheel assembly as defined in claim 1, wherein:
each one of said two bead regions of said tire has an up-turned configuration;
each one of said two bead rings being angled and thus forming an indentation; and
each one of said two bead regions of said tire being seated in said indentation formed by one of said two bead rings.

6. The vehicle wheel assembly as defined in claim 1, wherein:
said rim-associated second end region of each one of said two bead rings comprises an angled region;
said tire rim comprising two dually-angled edge regions;
each one of said dually-angled edge regions of said tire rim forming a locking groove; and said rim-associated second angled end regions of each one of said two bead rings engaging said locking groove formed by a related one of said two dually-angled edge regions of said tire rim.

7. The vehicle wheel assembly as defined in claim 1, wherein:
said two bead rings are made of spring steel.

8. The vehicle wheel assembly as defined in claim 1, wherein:
said two bead rings are vulcanized conjointly with said tire.

9. The vehicle wheel assembly as defined in claim 1, wherein:
said two bead rings are inserted into the ready-formed and vulcanized tire.

10. The vehicle wheel assembly as defined in claim 1, wherein:
said tire is made of rubber.

11. A tire-rim vehicle wheel assembly comprising:
a tire rim possessing two seat surfaces;
a tire;
said tire comprising a uni-ply or a multi-ply carcass having two free end regions;
said tire further comprising two bead regions and tow bead cores, each of which bead cores is associated with a related one of said two bead regions;
said two bead regions being seated at related ones of said two seat surfaces of said tire rim;
each said free end region of the carcass of said tire being anchored in a related one of said two bead regions by extending around a related one of said two bead cores;
two bead rings defining holding members axially holding related ones of said bead regions of the tire at said related seat surfaces of the tire rim;
each one of said two bead rings axially extending outwardly from a related one of said two bead regions of said tire;
each one of said two bead rings possessing a first end region associated with one of said bead regions and anchored in said one of said two bead regions of said tire and a second end region located axially outwardly from said first end region and releasably locked at said tire rim;
said rim-associated second end region of each one of said two bead rings being expandable in a resilient manner; and
two bead fillers, each of which is made of an elastomeric material and each of which constitutes one of said two bead cores.

12. The vehicle wheel assembly as defined in claim 11, wherein:
said tire is made of rubber.

13. A tire-rim vehicle wheel assembly comprising:
a tire rim possessing two seat surfaces;
a tire;
said tire comprising a uni-ply or a multi-ply carcass having two free end regions;
said tire further comprising two bead regions and two bead cores, each of which bead cores is associated with a related one of said two bead regions;
said two bead regions being seated at related ones of said two seat surfaces of said tire rim;
each said free end region of the carcass of said tire being anchored in a related one of said bead regions by extending around a related one of said two bead cores;
two bead rings defining holding members axially holding said tire at said tire rim;
each one of said two bead rings possessing a first end regions anchored in one of said two bead regions of said tire and a second end region associated with said tire rim and releasable locked at said tire rim;
said rim-associated second end region of each one of said two bead rings being expandable in a resilient manner;
two bead fillers, each of which is made of an elastomeric material and each of which constitutes one of said two bead cores;
said tire rim further comprising two up-turned edge regions;
each one of said two up-turned edge regions forming a locking groove;
each one of said two bead rings being lockable in a related one of said two locking grooves by means of said second end region of the associated one of said two bead rings;
a predetermined number of locking elements;
each one of said predetermined number of locking elements interrupting one of said two locking grooves formed at said tire rim;
each one of said two bead rings comprising a predetermined number of cuts; and
each one of said predetermined number of locking elements engaging a related one of said predetermined number of cuts in a related one of said two bead rings.

* * * * *

UNITED STATES PATENT AND TRADEMARK OFFICE
CERTIFICATE OF CORRECTION

PATENT NO.  : 4,745,958
DATED       : May 24, 1988
INVENTOR(S) : ERICH KRESTA

It is certified that error appears in the above-identified patent and that said Letters Patent is hereby corrected as shown below:

Column 2, line 49, after "art" please delete "." (period)

Column 3, line 15, please delete "tirerim" and insert --tire rim--

Column 3, line 16, please delete "requir" and insert --require--

Column 4, line 52, please delete "th at" and insert --that--

Column 4, line 65, after "vehicle" please delete "." (period)

Column 5, line 9, after "and" please insert --concepts--

Column 5, line 52, please delete "directional" and insert --direction--

Column 10, line 18, after "said please insert --two--

Column 10, line 24, please delete "regions" and insert --region-- (first occurrence)

UNITED STATES PATENT AND TRADEMARK OFFICE
CERTIFICATE OF CORRECTION

PATENT NO. : 4,745,958

DATED : May 24, 1988

INVENTOR(S) : ERICH KRESTA

It is certified that error appears in the above-identified patent and that said Letters Patent is hereby corrected as shown below:

Column 10, line 26, please delete "releasable" and insert --releasably--.

Signed and Sealed this

Twenty-first Day of February, 1989

Attest:

DONALD J. QUIGG

Attesting Officer

Commissioner of Patents and Trademarks